Dec. 21, 1937.                J. R. GAMMETER                2,102,949
          METHOD OF MAKING AND APPLYING CAPS TO BOTTLES
               Filed Jan. 2, 1936            2 Sheets-Sheet 1
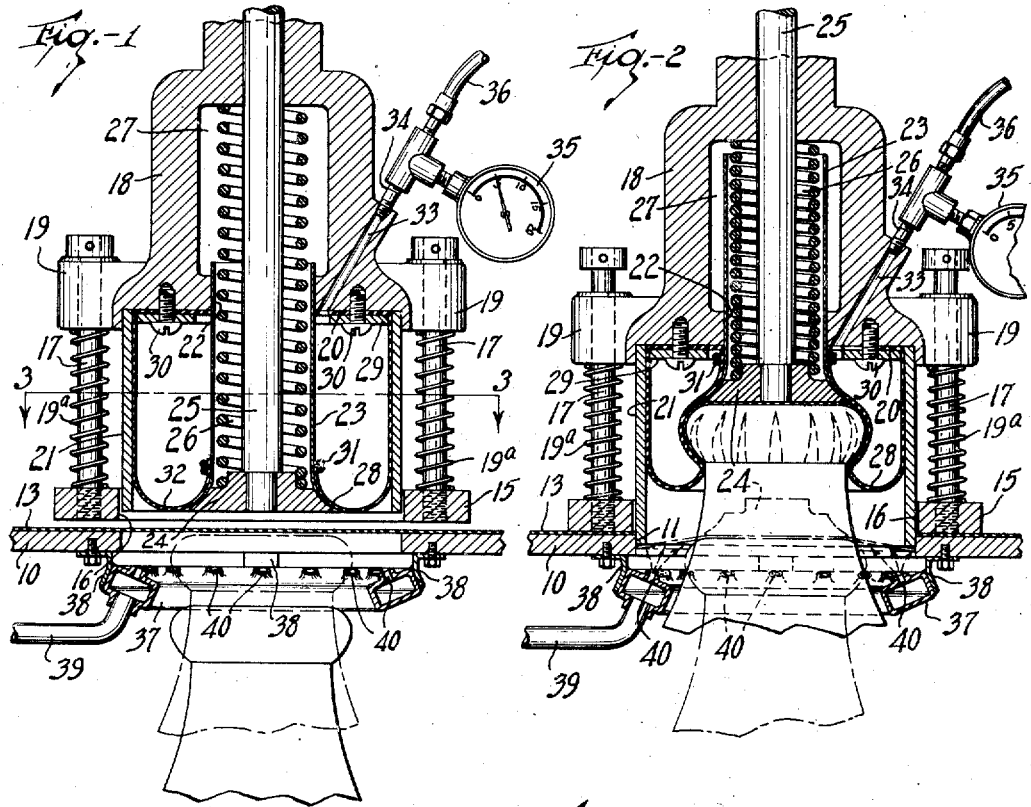
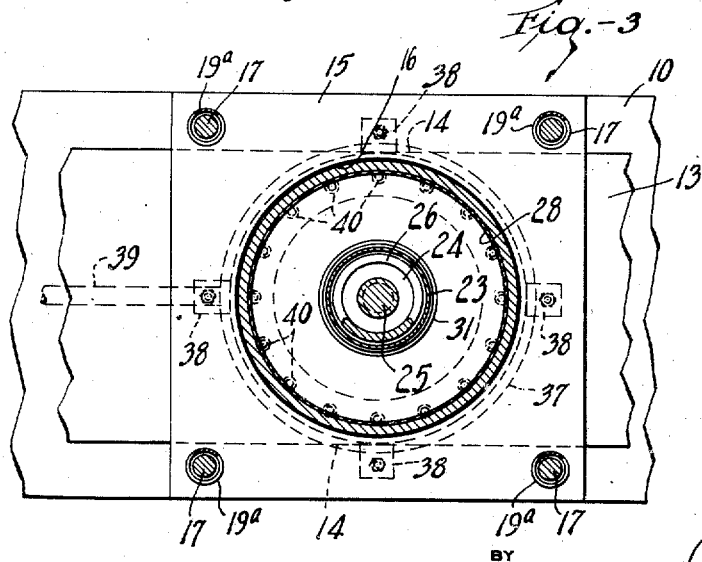
INVENTOR
JOHN R. GAMMETER
Albert L. Ely
ATTORNEY Dec. 21, 1937.    J. R. GAMMETER    2,102,949
METHOD OF MAKING AND APPLYING CAPS TO BOTTLES
Filed Jan. 2, 1936    2 Sheets-Sheet 2
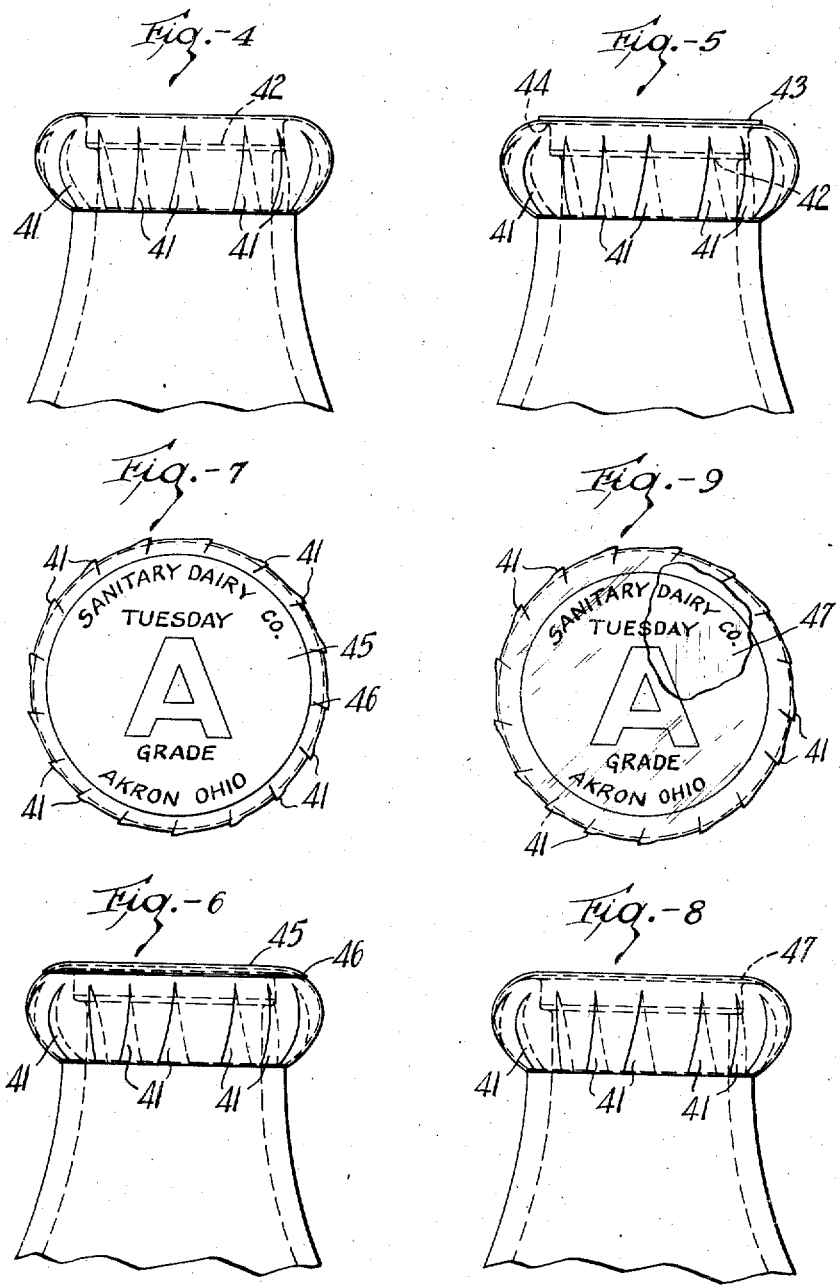
INVENTOR
JOHN R. GAMMETER
BY
Albert L. Ely
ATTORNEY Patented Dec. 21, 1937

2,102,949

UNITED STATES PATENT OFFICE 2,102,949

METHOD OF MAKING AND APPLYING CAPS TO BOTTLES

John R. Gammeter, Akron, Ohio, assignor of one-half to Susan G. Gammeter, Akron, Ohio Application January 2, 1936, Serial No. 57,282

11 Claims. (Cl. 226—83)

This invention relates to caps or hoods for bottles or containers, preferably milk bottles, and more particularly to a new method of forming the cap and applying the same so as to entirely enclose the open end of the bottle in a simple and expedient manner.

A further object of the invention is to continuously form caps and apply the same to the bottles in a rapid manner comparable with the filling and disc cap application operations.

A still further object of the invention is to select and employ a cap material produced from thermoplastic rubber derivatives, such as a rubber hydrohalide film, known as "Pliofilm," to be later referred to, which possesses heat-softening characteristics, so that upon the application of heat thereto portions can be pressed around the open end of the bottle in such a manner as to cause a sealing effect, thus preventing the cap from becoming unintentionally disengaged but at the same time without actually sticking to the walls of the bottle.

With the objects above indicated and other objects hereinafter explained in view, the invention consists in the new and novel method hereinafter described and claimed.

Referring to the drawings,

Figure 1 is a fragmentary vertical sectional view of an apparatus capable of forming and applying caps to milk bottles according to the method embodying the present invention;

Figure 2 is a similar sectional view to that shown in Figure 1 but showing the position of the bottle during the cap sealing operation;

Figure 3 is a transverse sectional view taken on line 3—3 in Figure 1;

Figure 4 is a fragmentary side elevational view of a milk bottle showing a cap applied thereto in accordance with the present invention;

Figure 5 is a similar view to Figure 4 but showing a modified form of cap;

Figure 6 is a similar view to Figure 4 but showing a still further modified form of cap;

Figure 7 is a top plan view of the cap shown in Figure 6;

Figure 8 is a view similar to Figure 4 but showing a still further modified form of cap;

Figure 9 is a top plan view of the cap shown in Figure 8.

The method embodying the present invention consists of forming a flat disc of a rubbed hydrohalide film, such as Pliofilm or similar material of a diameter somewhat greater than the diameter of the open end of the bottle to which the cap or hood is to be applied. This disc is next placed over the open end of the bottle in coaxial position and heat is applied to the marginal portion beyond the open end of the bottle which tends to soften the material. The marginal portion is then pressed downwardly around the bead to provide a crimped skirt portion with the result that overlapping portions are produced. Due to the fact that the bottle is relatively cold, the skirt portion cools instantly, thereby contracting to the form of the bottle and adhering thereto. The overlapping portions are adhesively secured to one another and thereby prevent the cap from becoming accidentally disengaged.

Pliofilm is selected because of its inherent yieldability, plasticity, heat-softening properties resulting in stickiness, and contractability, the material being a rubber hydrohalide film such as is disclosed in United States Patent No. 1,989,632, dated January 29, 1935. Other material having similar characteristics may be used. It is to be understood that in referring to this rubber hydrohalide film in both the specification and claims, I am referring to the product known as "Pliofilm".

In the drawings, one type of apparatus is illustrated for carrying out the method embodying the present invention, but it should be understood that other types may be employed for this purpose.

A horizontally disposed bed plate 10 is provided which may be supported by a floor or other suitable structure (not shown) and is provided with a circular opening 11. A continuous strip of a rubber hydrohalide film 13 rests upon the upper surface of the plate 10 and is intermittently fed therealong by any suitable mechanism (not shown), a portion of said strip extending across the opening and having marginal edges 14 extending beyond the adjacent edge of the opening 11 so that the strip may be maintained in continuous condition and rolled upon a reel or other receptacle (not shown) as it comes from the discharge end.

A stripper plate 15 is positioned above the bed plate 10 in parallel spaced relation and has an opening 16 coaxial with, but slightly larger in diameter than the opening 11. At diametrically opposite corners of the stripper plate 15 are upwardly extending posts, in this instance bolts 17, which have their lower ends in screw-threaded engagement with cooperating openings in the stripper plate. A head 18 has laterally extending lugs 19 corresponding in number with the number of bolts 17 and each of the lugs is provided with openings to receive the upper ends of the bolts, the heads thereof engaging the outer side of the lugs. Coiled springs 19a encircle bolts 17 and have their upper ends abutting the underside of the lugs 19 while the lower ends abut the stripper plate 15, thereby tending to maintain the head and stripper plate in spaced relation but at the same time permitting unitary movement.

The underside of the head 18 has an axial bore 20 within which the upper end of a cylindrical die 21 is forceably fitted. The lower end of the die extends downwardly and is normally disposed within the opening 16 in the stripper plate 15, there being a slight clearance to permit free relative movement. The diameter of the die 21 is slightly less at its lower end than the diameter of the opening 11 in the head plate 10 so as to cut out a disc of the rubber hydrohalide film from the strip which covers the opening for a purpose to be later described.

The head 18 has a further axial opening 22 within which a tube 23 is slidably mounted, the lower end being flared outwardly to receive a presser member 24. This presser member is of a diameter commensurate with the top of the bottle and has an axial opening to receive the reduced end of a rod 25 which is slidably supported in the head 18 above the opening 22. A coiled spring 26 encircles the rod 25 and has one end disposed within the tube 23. The lower end of the spring is secured to the presser member 24 while the opposite end abuts the upper end wall of a chamber 27 provided in the head 18. This permits the presser member 24 to be moved upwardly against the tension of the spring 26 as shown in Figure 2.

A rubber bag 28 is positioned within the die 21 and has its upper end extending inwardly, terminating in an opening to receive the tube 23. A retaining ring 29 is provided to hold the upper end of the bag in place and is secured by screws 30 to the head 18. The lower end of the bag 28 extends inwardly and is connected by elastic bands 31 to the lower end of the tube, leaving an exposed portion 32 between the die and the presser member. An opening 33 is provided in the head which communicates at its inner end with the interior of the rubber bag and is provided with screw-threads at its outer end to receive a pipe fitting 34. A pressure gauge 35 is connected to the pipe fitting 34 and also has connected therewith one end of a tube 36 which has its opposite end connected with an air pump or other source (not shown). Air is introduced into the bag 28 to any desirable pressure, such as 5 pounds as is indicated upon the gauge, and is normally so maintained.

A circular conduit 37 is positioned beneath the bed plate 10 encircling the opening 11 and is secured by brackets 38 connected respectively with the conduit and bed plate. An inlet pipe 39 has one end connected with the conduit and its opposite end connected with a source of heated air which is at a temperature of approximately 220° to 260° C. or sufficient to soften the rubber hydrohalide film and render the same sticky. Jets 40 are provided around the inside of the conduit and positioned so as to direct the heated air into contact with the marginal portion of the disc. Suitable valve means (not shown) is provided for controlling the application of the heated air in a manner to be later described.

In the operation of the apparatus, the rubber hydrohalide film strip is fed to a position in which the opening 11 is covered and stopped. The milk bottle to be capped is brought by a conveyor to the position indicated in full line in Figure 1. The bottle is next moved upwardly to a position shown in dot and dash lines just beneath the rubber hydrohalide film over the opening 11. The head 18 is next lowered so that the stripper plate 15 securely rests upon the rubber hydrohalide film and prevents it from slipping. Further downward movement of the head 18 causes the lower end of the die 21 to cut out a rubber hydrohalide film disc from the strip due to its cooperation with the opening 11 and the die is stopped at the position shown in Figure 2 and so held.

During the downward movement of the head 18 the presser member 24 engages the cut disc and holds it in contact with the top of the bottle as shown in dot and dash lines in Figure 2. At this time the heated air is turned on and is discharged through the jets 40 into contact with the marginal portion of the disc likewise shown in Figure 2 until it becomes softened, at which time the heated air is shut off.

The bottle is then moved upwardly against the tension of the spring 26 to the position shown in Figure 2. During this movement the portion 32 of the air bag 28 engages the lateral portion of the disc which becomes crimped and pressed, due to the inward pressure in the bag, around the bead of the bottle to produce a skirt portion. The bottle is cold, approximately 40° F., and this causes the heated rubber hydrohalide film to contract around the bead in its contact therewith and produce a tightly adhering skirt portion. In the crimping of the skirt portion overlapping portions are produced which are adhesively interconnected due to the sticky characteristics of the rubber hydrohalide film resulting from the application of heat.

The capped bottle is next lowered and carried away and the apparatus is then ready for the next capping operation in the manner aforesaid.

In Figure 4 the type of cap heretofore described is shown applied to a bottle. The overlapping portions are indicated at 41 which are adhesively interconnected. This interconnection is obtained by the softening of the material and due to the adhesive constituent in rubber hydrohalide film. The usual flat paper disc 42 is used so that the consumer has a means of temporarily sealing the bottle in use. The rubber hydrohalide film cap of course is destroyed when it is removed from the bottle. The rubber hydrohalide film is transparent so that the usual printing placed upon the paper disc 42 is visible therethrough. It is also possible to obtain rubber hydrohalide film in many different colors which makes it particularly desirable because different dairies can use this cap and still be distinguishable by each adopting a different color. This cap is sanitary, prevents the hands or animals from touching the open end of the bottle, has considerable resiliency or pliability so that sharp objects will not under usual circumstances puncture the same, and while adhering tightly to the bottle leaves no material on the bottle after it has been removed which would be most objectionable during the washing and sterilizing of the bottle at the dairy.

If it is desired to reinforce the cap or to have a printed portion appearing on the outside of the cap, paper discs may be used, several types of which are shown in Figures 5 to 9, inclusive. In Figure 5 a flat disc 43 may be attached to the outer surface of the cap extending slightly over the opening so as to rest upon the top wall 44. This disc 43 can be secured by adhesive either during the cap forming operation or after the cap has been applied. As to the former, these discs 43 can be secured to the strip 13 of a rubber hydrohalide film in spaced relation and fed therewith so that the cap is axially positioned within the die 21 in which case the presser member 24 engages the same during the capping operation. This disc may also have printed matter on its top surface. It will also be necessary to have the usual disc 42 provided in the open end of the bottle.

In Figures 6 and 7 a slightly different form of paper disc 45 is shown, it being provided with curved peripheral edge portions 46. The disc is adhesively secured to the cap and the curved edge projects slightly beyond the top wall. This disc may also have printed matter thereon as shown in Figure 7.

In Figures 8 and 9 a similar type of disc is shown to that illustrated in Figure 6, but in this case the disc 47 is secured to the under side of the cap. This cap likewise may have printed matter thereon such as shown in Figure 9 and in this instance the rubber hydrohalide film being transparent affords visibility so that the printed matter can be seen.

While I have described the preferred embodiment of the invention, it should be understood that I am not to be limited thereto inasmuch as changes and modifications may be resorted to without departing from the spirit of the invention as defined in the appended claims.

What is claimed is:

1. The method of making and applying caps to milk bottles and the like which comprises forming a disc of contractible material such as a rubber hydrohalide film or the like, superimposing said disc over the open end of the bottle, maintaining said disc in engagement with the open end of the bottle and simultaneously directing heated air against the marginal portion only of said disc, pressing the heated marginal portion of said disc around the bead of the bottle to produce a crimped skirt portion having overlapping portions, and setting the skirt portion to conform to the bead and causing the overlapping portions to become adhesively interconnected to prevent accidental removal of said cap.

2. The method of making and applying caps to milk bottles and the like which comprises forming a disc of contractible material such as a rubber hydrohalide film or the like, superimposing said disc over the open end of the bottle, maintaining said disc in engagement with the open end of the bottle and simultaneously directing heated air at a temperature of approximately 220° F. to 260° F. against the marginal portion only of said disc, pressing the heated marginal portion of said disc around the bead of the bottle to produce a crimped skirt portion having overlapping portions, and setting the skirt portion to conform to the bead and causing the overlapping portions to become adhesively interconnected to prevent accidental removal of said cap.

3. The method of making and applying caps to milk bottles and the like which comprises intermittently feeding a continuous strip of contractible material such as a rubber hydrohalide film or the like, forming a disc from said strip when in non-moving position and over the open end of a bottle, maintaining said disc in engagement with the open end of the bottle and simultaneously directing heated air against the marginal portion only of said disc, pressing the heated marginal portion of said disc around the bead of the bottle to produce a crimped skirt portion having overlapping portions, setting the skirt portion to conform to the bead and causing the overlapping portions to become adhesively interconnected to prevent accidental removal of said capped bottle, removing the capped bottle, and feeding said strip to provide a different portion from which the next disc is to be formed.

4. In an apparatus for making and applying caps to milk bottles and the like in which a strip of contractible material such as a rubber hydrohalide film or the like is adapted to be fed above the open end of a bottle, means for receiving and supporting said bottle, a stripper member engageable with said strip of contractible material, means for providing a disc from said strip of contractible material in superimposed relation with respect to the open end of said bottle, yieldable means for maintaining said disc in engagement with the open end of said bottle, means for directing heated air against the marginal edge of said disc to soften the same, and inflatable flexible means adapted for engagement with said disc and bottle, said bottle and disc being adapted for movement into engagement with said inflatable means whereby the marginal portion of said disc is crimped about the bead of the bottle to secure the same thereto.

5. In an apparatus for making and applying caps to milk bottles and the like, a member adapted to receive and support a strip of contractible material such as a rubber hydrohalide film or the like and having an opening therein over which the material extends, a conduit on the under side of said supporting member and having discharge openings through which heated air is directed into contact with said material, means for supporting a bottle with its open end disposed within said opening directly beneath said material, a movable head mounted above said bottle, a stripper plate yieldably mounted on said head and adapted to engage said material on the opposite side from said supporting member, a die mounted on and movable with said head and adapted to cooperate with the opening in said supporting member to punch a disc from the material thereon, a presser member slidably mounted on said head and having a portion engageable with said disc for temporarily holding the latter on the open end of the bottle, and an inflatable member secured to said head and adapted for engagement with said disc and bottle, said disc and bottle being movable into cooperative engagement with said inflatable member whereby the marginal portion of said disc is crimped about the bead of said bottle to secure the same thereto.

6. In an apparatus for making and applying caps to milk bottles and the like in which a continuous strip of contractible material such as a rubber hydrohalide film or the like is adapted to be intermittently fed, cooperative die members adapted to punch a disc from said material, means for supporting a bottle with the open end in close proximity to said disc, means for maintaining said disc in engagement with the open end of said bottle, means for directing heated air into contact with the marginal portion of said disc, and flexible means adapted for engagement with the marginal portion of said disc for crimping the latter about the bead of the bottle to secure the same thereto.

7. In an apparatus for making and applying caps to milk bottles and the like in which a continuous strip of contractible material such as a rubber hydrohalide film or the like is adapted to be intermittently fed, cooperative die members adapted to punch a disc from said material, means for supporting a bottle with the open end in close proximity to said disc, means for maintaining said disc in engagement with the open end of said bottle, and means for directing heated air into contact with the marginal portion of said disc while the latter is maintained in engagement with the open end of said bottle.

8. In apparatus for making and applying caps to containers in which a continuous strip of contractible material is adapted to be intermittently fed, the sub-combination of means for punching a cap from said material, means for maintaining said cap in engagement with a container, and a conduit for directing heated air into contact with the marginal portion only of said cap.

9. In apparatus for making and applying caps to containers in which a continuous strip of contractible material is adapted to be intermittently fed, the sub-combination of means for punching a cap from said material, means for supporting said cap in disc form in engagement with a container, a conduit for directing heated air into contact with the marginal portion only of said disc, and means for pressing the heated marginal portion of said disc around the top of said container.

10. In apparatus for making and applying caps to containers in which a continuous strip of contractible material is adapted to be intermittently fed, the sub-combination of means for punching a cap from said material, means for supporting a container, means for maintaining said cap in substantially disc form in engagement with said container, and an annular conduit having a plurality of spaced jets for directing air into contact with the marginal portion only of said disc.

11. In apparatus for making and applying caps to containers in which a continuous strip of contractible material is adapted to be intermittently fed, the sub-combination of means for punching a cap from said material, means for supporting a container, means for maintaining said cap in substantially disc form in engagement with said container, an annular conduit having a plurality of spaced jets for directing heated air into contact with the marginal portion only of said disc, and means for pressing the heated marginal portion of said disc around the top of said container.

JOHN R. GAMMETER.

CERTIFICATE OF CORRECTION.

Patent No. 2,102,949.   December 21, 1937.

JOHN R. GAMMETER.

It is hereby certified that error appears in the printed specification of the above numbered patent requiring correction as follows: Page 1, first column, line 51, for the word "rubbed" read rubber; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)

caps to milk bottles and the like in which a continuous strip of contractible material such as a rubber hydrohalide film or the like is adapted to be intermittently fed, cooperative die members adapted to punch a disc from said material, means for supporting a bottle with the open end in close proximity to said disc, means for maintaining said disc in engagement with the open end of said bottle, and means for directing heated air into contact with the marginal portion of said disc while the latter is maintained in engagement with the open end of said bottle.

8. In apparatus for making and applying caps to containers in which a continuous strip of contractible material is adapted to be intermittently fed, the sub-combination of means for punching a cap from said material, means for maintaining said cap in engagement with a container, and a conduit for directing heated air into contact with the marginal portion only of said cap.

9. In apparatus for making and applying caps to containers in which a continuous strip of contractible material is adapted to be intermittently fed, the sub-combination of means for punching a cap from said material, means for supporting said cap in disc form in engagement with a container, a conduit for directing heated air into contact with the marginal portion only of said disc, and means for pressing the heated marginal portion of said disc around the top of said container.

10. In apparatus for making and applying caps to containers in which a continuous strip of contractible material is adapted to be intermittently fed, the sub-combination of means for punching a cap from said material, means for supporting a container, means for maintaining said cap in substantially disc form in engagement with said container, and an annular conduit having a plurality of spaced jets for directing air into contact with the marginal portion only of said disc.

11. In apparatus for making and applying caps to containers in which a continuous strip of contractible material is adapted to be intermittently fed, the sub-combination of means for punching a cap from said material, means for supporting a container, means for maintaining said cap in substantially disc form in engagement with said container, an annular conduit having a plurality of spaced jets for directing heated air into contact with the marginal portion only of said disc, and means for pressing the heated marginal portion of said disc around the top of said container.

JOHN R. GAMMETER.

CERTIFICATE OF CORRECTION.

Patent No. 2,102,949.　　　　　　　　　　　December 21, 1937.

JOHN R. GAMMETER.

It is hereby certified that error appears in the printed specification of the above numbered patent requiring correction as follows: Page 1, first column, line 51, for the word "rubbed" read rubber; and that the said Letters Patent should be read with this correction therein that the same may conform to the record of the case in the Patent Office.

Signed and sealed this 22nd day of February, A. D. 1938.

Henry Van Arsdale,
(Seal)　　　　　　　　　　　　　　　Acting Commissioner of Patents.

CERTIFICATE OF CORRECTION.

Patent No. 2,102,949.   December 21, 1937.

JOHN R. GAMMETER.

It is hereby certified that error appears in the printed specification of the above numbered patent requiring correction as follows: Page 1, first column, line 51, for the word "rubbed" read rubber; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.